United States Patent [19]

Floyd

[11] Patent Number: 5,511,814

[45] Date of Patent: Apr. 30, 1996

[54] TRAILER BALL LOCK APPARATUS

[76] Inventor: Jason Floyd, 908 S. Jackson, El Dorado Springs, Mo. 64744

[21] Appl. No.: 421,526

[22] Filed: Apr. 13, 1995

[51] Int. Cl.$^6$ ................................. B60D 1/28; B60D 1/06
[52] U.S. Cl. .......................... 280/507; 280/511; 411/237; 411/910
[58] Field of Search .................................. 280/507, 511; 411/910, 237

[56] References Cited

U.S. PATENT DOCUMENTS

| | | | |
|---|---|---|---|
| D. 342,472 | 12/1993 | Harper | D12/162 |
| 4,230,336 | 10/1980 | Avrea et al. | 280/511 X |
| 4,542,914 | 9/1985 | Shropshire | 280/507 |
| 4,889,356 | 12/1989 | Morris | 280/511 X |
| 5,087,064 | 2/1992 | Guhlin | 280/507 |
| 5,222,755 | 6/1993 | O'Neal | 280/511 X |
| 5,280,941 | 1/1994 | Guhlin | 280/507 |
| 5,290,057 | 3/1994 | Pellerito | 280/507 |
| 5,322,316 | 6/1994 | Wheeler | 280/507 |
| 5,395,131 | 3/1995 | Herrick | 280/511 X |

*Primary Examiner*—Margaret A. Focarino
*Assistant Examiner*—F. Zeender

[57] ABSTRACT

A trailer ball lock apparatus includes an externally threaded connecting bolt member which has a longitudinal axis and which includes a first longitudinal slot. A ball assembly includes an internally threaded, longitudinally oriented, connecting-bolt-receiving well and is adapted to receive the connecting bolt member. The ball assembly includes a top ball portion and a base portion. The ball portion includes a pin-receiving well portion located on a first side of the connecting-bolt-receiving well and includes a pin-receiving channel portion located on a second side of the connecting-bolt-receiving well. A locking pin assembly includes a lock pin portion adapted to extend through the pin-receiving channel portion into the pin-receiving well portion of the ball portion. The lock pin portion is placed in registration with the first longitudinal slot of the connecting bolt member for preventing rotation of the connecting bolt member within the ball assembly. A second longitudinal slot may be located in the connecting bolt member. The second longitudinal slot is oriented perpendicular to the first longitudinal slot. The pin-receiving channel portion includes an internally threaded portion, and the locking pin assembly includes an externally threaded portion adapted to screw into the internally threaded portion of the pin-receiving channel portion. The externally threaded portion of the locking pin assembly has a receiver portion located longitudinally at one end of the externally threaded portion.

3 Claims, 3 Drawing Sheets

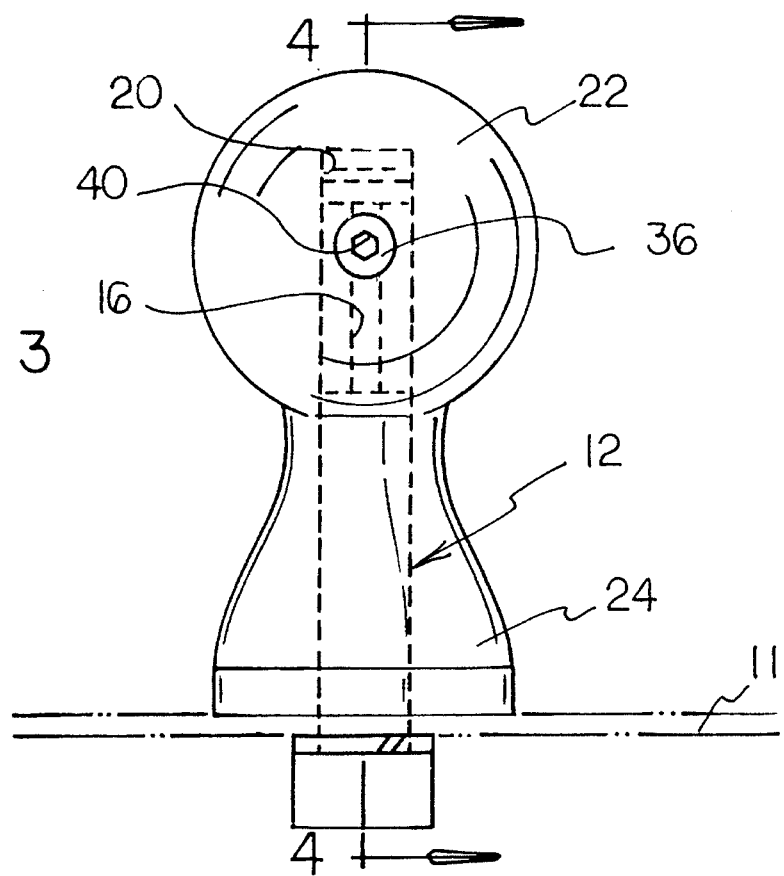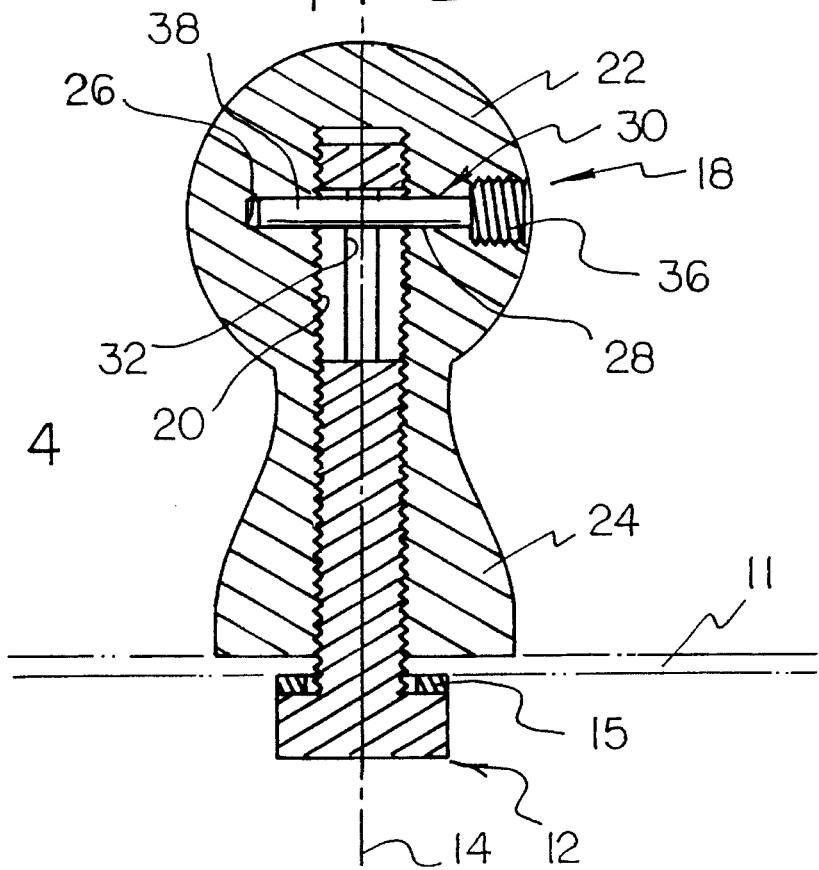

5,511,814

TRAILER BALL LOCK APPARATUS

BACKGROUND OF THE INVENTION

1. Field of the Invention

The present invention relates generally to devices for connecting a trailer to an automotive vehicle and, more particularly, to devices especially adapted for preventing disconnection of the trailer from the automotive vehicle.

2. Description of the Prior Art

An often used mechanism for connecting a trailer to an automotive vehicle utilizes a trailer ball attached to a bumper of the automotive vehicle. More specifically, a connecting bolt is pushed through a hole in a bumper of the automotive vehicle, and a trailer ball is screwed onto the connecting bolt. Then, a trailer, having a complementary socket for the trailer ball, is connected to the trailer ball. Unfortunately, thieves have devised techniques for stealing trailers by separating the trailer ball from the bumper. This is done either by unscrewing the connecting bolt from the trailer bail or, alternatively, by unscrewing the trailer ball from the connecting bolt. In view of the problem of theft, it would be desirable if a way were provided for preventing a connecting bolt to be unscrewed from a trailer ball. Alternatively, it would be desirable if a way were provided for preventing a trailer ball from being unscrewed from a connecting bolt.

Throughout the years, a number of innovations have been developed relating to preventing a trailer from being stolen from an automotive vehicle, and the following U.S. patents are representative of some of those innovations: U.S. Pat. Nos. 5,087,064; 5,222,755; 5,280,941; 5,322,316; and U.S. Pat. No. Des. 342,472. More specifically, U.S. Pat. No. 5,087,064 discloses a conventional trailer ball and connecting bolt connection that is augmented by an added-on guard device which prevents a trailer socket from being lifted off of a trailer ball. To avoid additional material and labor, it would be desirable if a way were provided for preventing separation of a trailer ball and a connecting bolt without using an added-on guard device which prevents a trailer socket from being lifted off of a trailer ball.

U.S. Pat. No. 5,280,941 discloses an anti-theft ball assembly for a ball and socket trailer hitch wherein the connecting bolt and retaining nut that clamp the trailer ball assembly to a bumper or tow bar are covered by a cup-shaped cover that combines with the trailer socket to prevent access to the connecting bolt and nut. To employ this device, a single longitudinal channel must be provided that runs through both the trailer bail assembly and the connecting bolt. Moreover, the cup-shaped cover must include not only a cup-shaped cover portion, but it must also include a long bolt portion that fits into the single, longitudinal channel. Manufacturing such a single longitudinal channel and manufacturing such a cup-shaped cover may be quite difficult and time consuming. In this respect, it would be desirable if a way were provided for securing a trailer ball to a connecting bolt which does not require the use of a single, longitudinal channel through both the trailer ball and the connecting bolt and does not require the use of a cup-shaped cover for the connecting bolt.

U.S. Pat. Nos. 5,222,755 and 5,322,316 may be of interest for their disclosure of trailer locks that prevent unattached trailers from being attached to unauthorized towing vehicles. In addition, U.S. Pat. No. Des. 342,472 may be of interest for its disclosure of an ornamental design for a security trailer hitch ball.

Still other features would be desirable in a trailer ball lock apparatus. For example, unscrewing a trailer ball from a connecting bolt requires a relative rotational motion between the connecting bolt and the trailer ball. To prevent the trailer ball from being unscrewed from the connecting bolt, it would be desirable to prevent relative rotational motion between the connecting bolt and the trailer ball.

In addition, once the socket of the trailer is connected to the trailer ball, it would be desirable if the trailer ball lock apparatus were prevented from being removed from the automotive vehicle. In other words, it would be desirable if the trailer ball lock apparatus can be removed from the automotive vehicle only when the socket of the trailer is disconnected from the trailer ball.

Thus, while the foregoing body of prior art indicates it to be well known to use devices for preventing theft of a trailer from an automotive vehicle, the prior art described above does not teach or suggest a trailer ball lock apparatus which has the following combination of desirable features: (1) prevents a connecting bolt from being unscrewed from trailer ball; (2) prevents a trailer ball from being unscrewed from a connecting bolt; (3) prevents separation of a trailer ball from a connecting bolt without using an added-on guard device which prevents a trailer socket from being lifted off of a trailer ball; (4) does not require the use of a single, longitudinal channel through both the trailer ball and the connecting bolt and does not require the use of a cup-shaped cover for the connecting bolt; (5) prevents relative rotational motion between the connecting bolt and the trailer ball; is (6) is prevented from being removed from the automotive vehicle when the socket of the trailer is connected to the trailer ball. The foregoing desired characteristics are provided by the unique trailer ball lock apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a trailer ball lock apparatus which includes an externally threaded connecting bolt member which has a longitudinal axis and which includes a first longitudinal slot. A ball assembly includes an internally threaded, longitudinally oriented, connecting-bolt-receiving well and is adapted to receive the connecting bolt member. The ball assembly includes a top ball portion and a base portion. The ball portion includes a pin-receiving well portion located on a first side of the connecting-bolt-receiving well and includes a pin-receiving channel portion located on a second side of the connecting-bolt-receiving well. A locking pin assembly includes a lock pin portion adapted to extend through the pin-receiving channel portion into the pin-receiving well portion of the ball portion. The lock pin portion is placed in registration with the first longitudinal slot of the connecting bolt member for preventing rotation of the connecting bolt member within the ball assembly. A second longitudinal slot may be located in the connecting bolt member. The second longitudinal slot is oriented perpendicular to the first longitudinal slot.

The pin-receiving channel portion includes an internally threaded portion, and the locking pin assembly includes an externally threaded portion adapted to screw into the internally threaded portion of the pin-receiving channel portion. The externally threaded portion of the locking pin assembly has a receiver portion located longitudinally at one end of the externally threaded portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in; the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer ball lock apparatus which has all of the advantages of the prior art and none of the disadvantages.

It is another object of the present invention to provide a new and improved trailer ball lock apparatus which may be easily and efficiently manufactured and marketed.

It is a further object of the present invention to provide a new and improved trailer ball lock apparatus which is of durable and reliable construction.

An even further object of the present invention is to provide a new and improved trailer bail lock apparatus which is susceptible of a low cost of manufacture with regard to both material and labor, and which accordingly is then susceptible of low prices of sale to the consuming public, thereby making such trailer ball lock apparatus available to the buying public.

Still yet a further object of the prevent invention is to provide a new and improved trailer bail lock apparatus which prevents a connecting bolt from being unscrewed from a trailer ball.

Still another object of the present invention is to provide a new and improved trailer ball lock apparatus that prevents a trailer ball from being unscrewed from a connecting bolt.

Yet another object of the present invention is to provide a new and improved trailer ball lock apparatus which prevents separation of a trailer ball from a connecting bolt without using an added-on guard device which prevents a trailer socket from being lifted off of a trailer ball.

Even another object of the present invention is to provide a new and improved trailer bail lock apparatus that does not require the use of a single, longitudinal channel through both the trailer ball and the connecting bolt and does not require the use of a cup-shaped cover for the connecting bolt.

Still a further object of the present invention is to provide a new and improved trailer ball lock apparatus which prevents relative rotational motion between the connecting bolt and the trailer ball.

Yet another object of the present invention is to provide a new and improved trailer ball lock apparatus that is prevented from being removed from the automotive vehicle when the socket Of the trailer is connected to the trailer ball.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged front view of the embodiment of the trailer ball lock apparatus of FIG. 1 installed on the bumper of the automotive vehicle.

FIG. 4 is a cross-sectional view of the embodiment of the invention shown in FIG. 3 taken along line 4—4 of FIG. 3.

DESCRIPTION OF THE PREFERRED EMBODIMENT

With reference to the drawings, a new and improved trailer ball lock apparatus embodying the principles and concepts of the present invention will be described.

Figure 1:
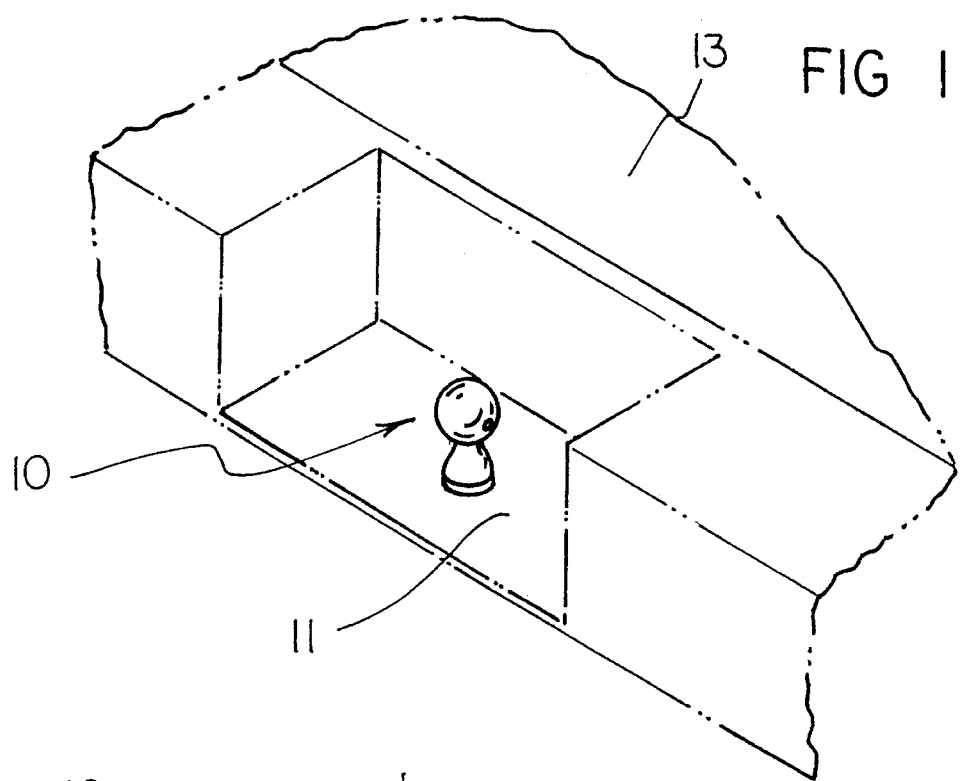
FIG. 1 is a perspective view showing a preferred embodiment of the trailer ball lock apparatus of the invention in place on a bumper of an automotive vehicle.
Figure 2:
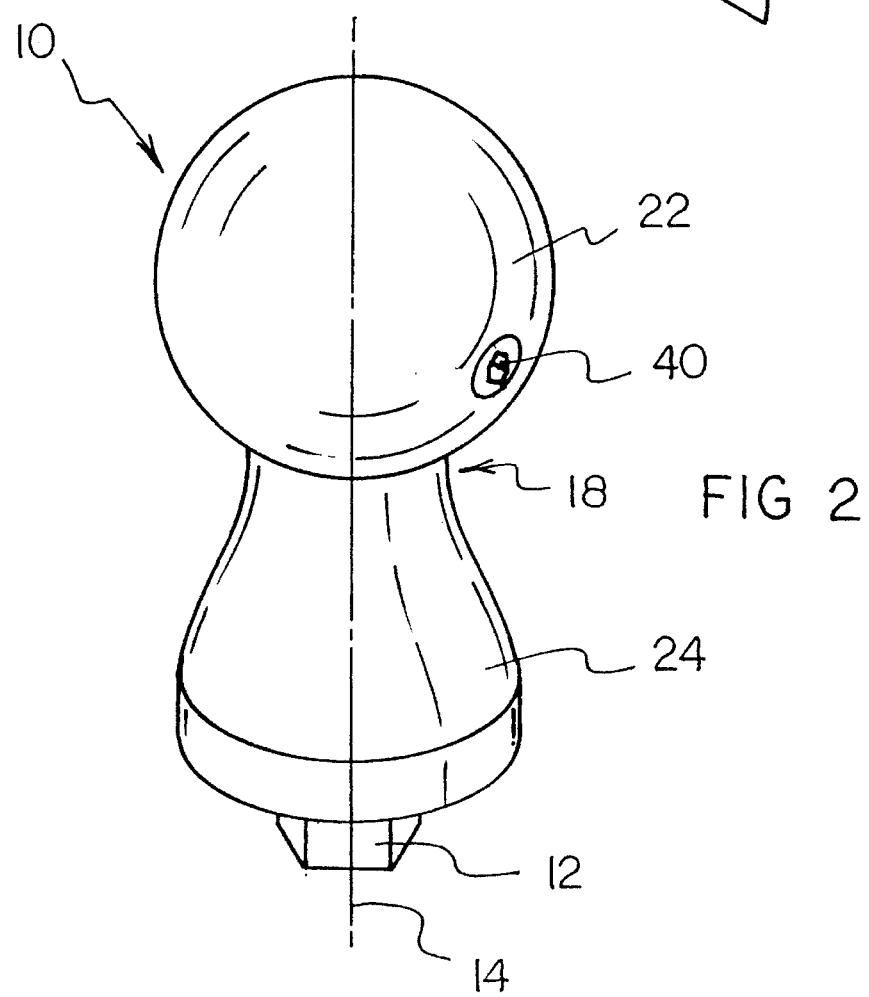
FIG. 2 is an enlarged perspective view of the embodiment of the trailer ball lock apparatus shown in FIG. 1 removed from the automotive vehicle.
Figure 5:
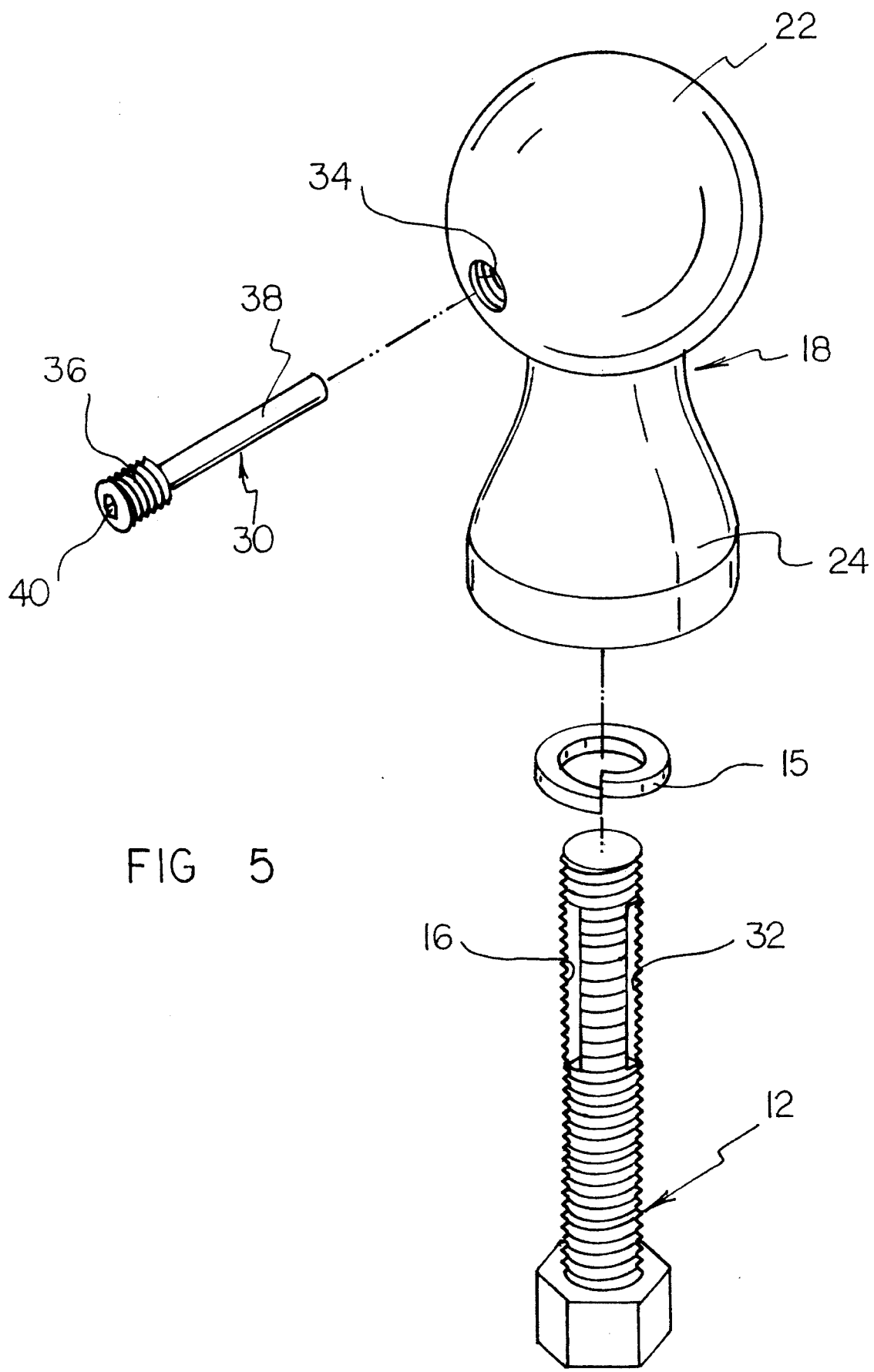
FIG. 5 is an exploded view of the embodiment of the invention shown in FIG. 4 removed from the bumper of the automotive vehicle.

Turning to FIGS. 1–5, there is shown an exemplary embodiment of the trailer ball lock apparatus of the invention generally designated by reference numeral 10. In its preferred form, trailer ball lock apparatus 10 includes an externally threaded connecting bolt member 12 which has a longitudinal axis 14 and which includes a first longitudinal slot 16. A ball assembly 18 includes an internally threaded, longitudinally oriented, connecting-bolt-receiving well 20 and is adapted to receive the connecting bolt member 12. The ball assembly 18 includes a top ball portion 22 and a base portion 24. The ball portion 22 includes a pin-receiving well portion 26 located on a first side of the connecting-bolt-receiving well 20 and includes a pin-receiving channel portion 28 located on a second side of the connecting-bolt-receiving well 20. A locking pin assembly 30 includes a lock pin portion 38 adapted to extend through the pin-receiving channel portion 28 into the pin-receiving well portion 26 of the ball portion 22. The lock pin portion 38 is placed in registration with the first longitudinal slot 16 of the connecting bolt member 12 for preventing rotation of the connecting bolt member 12 within the ball assembly 18. A second longitudinal slot 32 may be located in the connecting bolt member 12. The second longitudinal slot 32 is oriented perpendicular to the first longitudinal slot 16.

The pin-receiving channel portion 28 includes an internally threaded portion 34, and the locking pin assembly 30 includes an externally threaded portion 36 adapted to screw into the internally threaded portion 34 of the pin-receiving channel portion 28. The externally threaded portion 36 of the locking pin assembly 30 has a receiver portion 40 located longitudinally at one end of the externally threaded portion 36. The receiver portion 40 is adapted to receive a tip of a driver for screwing the externally threaded portion 36 of the locking pin assembly 30 into the internally threaded portion 34 of the pin-receiving channel portion 28. The receiver portion 40 can be in the form of a hexagon-shaped well.

In using the trailer ball lock apparatus 10 of the invention, the shank portion of the connecting bolt member 12 is passed through a hole (not shown) in a bumper 11 of an automotive vehicle 13. One or more washers 15 may be placed over the shank of the connecting bolt member 12 and placed on the head portion of the connecting bolt member 12 for proper spacing of the first longitudinal slot 16 or the second longitudinal Slot 32 with respect to the pin-receiving well portion 26 and the pin-receiving channel portion 28 of the ball portion 22 of the ball assembly 18. The ball assembly 18 is screwed onto the shank of the connecting bolt member 12 and tightened so that the bumper 11 is sandwiched between the base portion 24 of the ball assembly 18 mid the washer 15. More specifically, the washer 15 and the bumper 11 are squeezed between the ball assembly 18 and the head portion of the connecting bolt member 12. At this point, the ball assembly 18 is installed on the bumper 11. A final adjustment is made so that either the first longitudinal slot 16 or the second longitudinal slot 32 of the connecting bolt member 12 are placed in registration with; the pin-receiving well portion 26 and the pin-receiving channel portion 28 of the ball portion 22 of the ball assembly 18.

Then, the locking pin assembly 30 is inserted into the ball portion 22 of the ball assembly 18. More specifically, the lock pin portion 38 of the locking pin assembly 30 is passed through the pin-receiving channel portion 28 of the ball portion 22, through either the first longitudinal slot 16 or the second longitudinal slot 32 of the connecting bolt member 12 (whichever is in registration with the pin-receiving channel portion 28), and into the pin-receiving well portion 26 of the ball portion 22. In addition, a driver (not shown), such as a hexagon-shaped wrench, is used to turn the externally threaded portion 36 of the locking pin assembly 30 into the internally threaded portion 34 of the ball portion 22. When this is done, the locking pin assembly 30 is locked into the ball portion 22 of the ball assembly 18, and the connecting bolt member 12 is prevented from is rotated with respect to the ball assembly 18.

It is noted that when a socket portion of a trailer hitch (not shown) is placed over the ball portion 22 of the ball assembly 18, the receiver portion 40 of the externally threaded portion 36 of the locking pin assembly 30 is covered by the socket portion of the trailer hitch, thereby preventing anyone from removing the locking pin assembly 30 from the ball assembly 18.

If desired, the trailer ball lock apparatus 10 of the invention can be marketed as a theft proof package with a coupler lock. The trailer ball lock apparatus 10 can be provided in a kit form with connecting bolt members 12 of different length for bumpers 11 of different thicknesses. One or more washers can be provided in a kit to assure proper alignment and registration of the first longitudinal slot 16 and the second longitudinal slot 32 with the pin-receiving channel portion 28 and the pin-receiving well portion 26 of the ball portion 22 of the ball assembly 18.

The components of the trailer ball lock apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved trailer ball lock apparatus that is low in cost, relatively simple in design and operation, and which may advantageously be used to prevent a connecting bolt from being unscrewed from a trailer ball. With the invention, a trailer ball lock apparatus is provided which prevents a trailer ball from being unscrewed from a connecting bolt. With the invention, a trailer ball lock apparatus is provided which prevents separation of a trailer ball from a connecting bolt without using an added-on guard device which prevents a trailer socket from being lifted off of a trailer ball. With the invention, a trailer ball lock apparatus is provided which does not require the use of a single, longitudinal channel through both the trailer ball and the connecting bolt and does not require the use of a cup-shaped cover for the connecting bolt. With the invention, a trailer ball lock apparatus is provided which prevents relative rotational motion between the connecting bolt and the trailer ball. With the invention, a trailer ball lock apparatus is provided which is prevented from being removed from the automotive vehicle when the socket of the trailer is connected to the trailer ball.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A trailer ball lock apparatus, comprising:

an externally threaded connecting bolt member having a longitudinal axis, wherein said connecting bolt member includes a first longitudinal slot, a ball assembly which includes an internally threaded, longitudinally oriented, connecting-bolt-receiving well adapted to receive said connecting bolt member, wherein said ball assembly includes a top ball portion and a base portion, wherein said ball portion includes a pin-receiving well portion extending from a first side of said connecting-bolt-receiving well to a terminating point within the ball assembly, wherein said ball portion includes a pin-receiving channel portion located on a second side of said connecting-bolt-receiving well, and a locking pin assembly which includes a lock pin portion adapted to extend through said pin-receiving channel portion into said pin-receiving well portion of said ball portion of said ball assembly, wherein said lock pin portion is placed in registration with said first longitudinal slot of said connecting bolt member for preventing rotation of said connecting bolt member within said ball assembly, wherein said pin-receiving channel portion of said ball portion of said ball assembly includes an internally threaded portion, and wherein said locking pin assembly includes an externally threaded portion adapted to screw into said internally threaded portion of said pin-receiving channel portion.

2. The apparatus of claim 1, further including:

a second longitudinal slot in said connecting bolt member, wherein said second longitudinal slot is oriented perpendicular to said first longitudinal slot.

3. A trailer ball lock apparatus, comprising:

an externally threaded connecting bolt member having a longitudinal axis, wherein said connecting bolt member includes a first longitudinal slot, a ball assembly which includes an internally threaded, longitudinally oriented, connecting-bolt-receiving well adapted to receive said connecting bolt member, wherein said ball assembly includes a top ball portion and a base portion, wherein said ball portion includes a pin-receiving well portion extending from a first side of said connecting-bolt-receiving well to a terminating point within the ball assembly, wherein said ball portion includes a pin-receiving channel portion located on a second side of said connecting-bolt-receiving well, a locking pin assembly which includes a lock pin portion adapted to extend through said pin-receiving channel portion into said pin-receiving well portion of said ball portion of said ball assembly, wherein said lock pin portion is placed in registration with said first longitudinal slot of said connecting bolt member of preventing rotation of said connecting bolt member within said ball assembly, wherein said pin-receiving channel portion of said ball portion of said ball assembly includes an internally threaded portion, and wherein said locking pin assembly includes an externally threaded portion adapted to screw into said internally threaded portion of said pin-receiving channel portion, and wherein said externally threaded portion of said locking pin assembly includes a receiver portion located longitudinally at one end of said externally threaded portion.

* * * * *